United States Patent [19]
Ma

[11] Patent Number: 5,255,214
[45] Date of Patent: Oct. 19, 1993

[54] PORTABLE COMPUTER WITH A LEVEL AND ANGULAR POSITION ADJUSTABLE LCD ASSEMBLY

[76] Inventor: Hsi-Kuang Ma, 4F, No. 48, Sec. 2, Chung Cherng Road, Taipei, Taiwan

[21] Appl. No.: 943,694

[22] Filed: Sep. 11, 1992

[51] Int. Cl.$^5$ ............................................. G06F 1/00
[52] U.S. Cl. ............................. 364/708.1; 364/705.03
[58] Field of Search .................... 364/708, 705.03; 400/83, 680; 361/393; 340/707

[56] References Cited

U.S. PATENT DOCUMENTS

| | | | |
|---|---|---|---|
| 4,749,364 | 6/1988 | Arney et al. | 364/708 X |
| 4,859,092 | 8/1989 | Makita | 400/83 |
| 5,103,376 | 4/1992 | Blonder | 364/708 X |
| 5,200,913 | 4/1993 | Hawkins et al. | 364/708 |

Primary Examiner—Tan V. Mai
Attorney, Agent, or Firm—Bacon & Thomas

[57] ABSTRACT

A portable computer includes a mainframe having a keyboard on the top, a revolving shaft having two spaced perpendicular stub rods pivotably retained in two spaced notches on an elongated block on the mainframe by elastic packing elements and two spaced perpendicular supports adjacent to two opposite ends thereof, and an LCD (liquid crystal display) screen framed by a channel frame and pivotably retained between the two perpendicular supports by elastic packing elements. Therefore, the LCD screen can be adjusted to any of plural various level positions and any of plural various angular positions relative to the mainframe. The LCD screen receives input signals from the keyboard as well as input signals from a pen base input device.

2 Claims, 3 Drawing Sheets

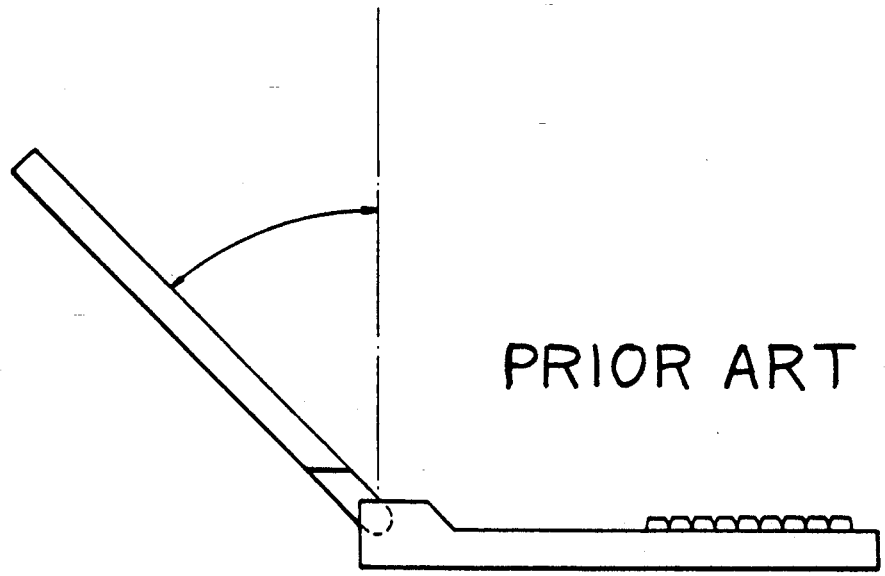
F I G. 1
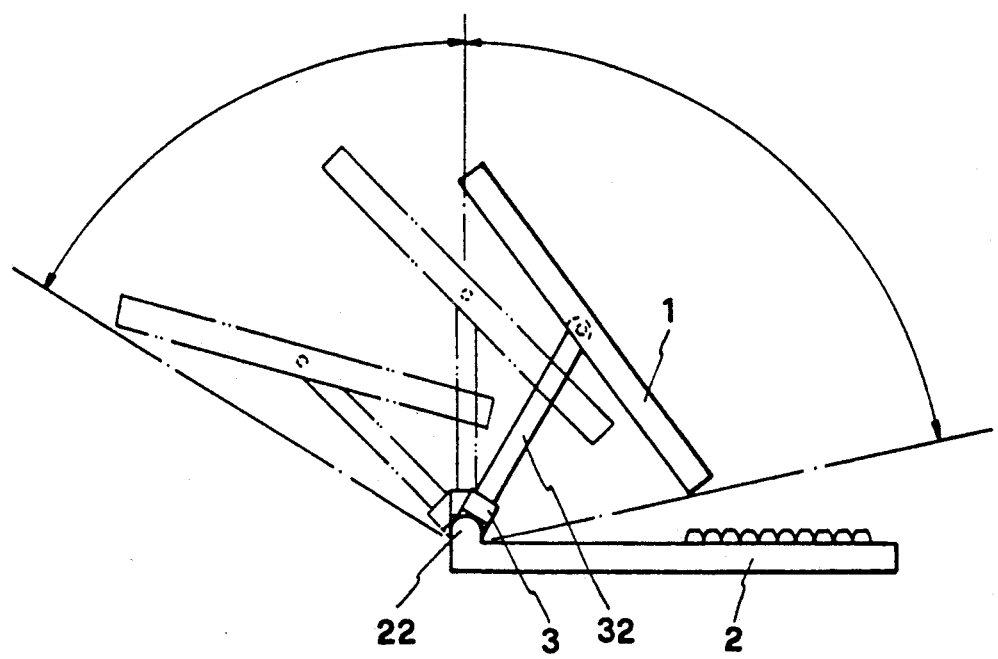
F I G. 3

PORTABLE COMPUTER WITH A LEVEL AND ANGULAR POSITION ADJUSTABLE LCD ASSEMBLY

BACKGROUND OF THE INVENTION

The present invention relates to a portable computer and, more particularly, to a portable computer having an LCD (Liquid Crystal Display) assembly that can be adjusted to any of plural various level positions and any of plural various angular positions relative to the mainframe thereof.

Various portable computers, including lap-top computers, notebook computers and palm-top computers, are widely known and accepted for the advantage of their mobility. A portable computer is generally comprised of a mainframe having a keyboard, and an LCD assembly. As shown in FIG. 1, the LCD assembly is pivoted to the mainframe and, therefore, can be adjusted to any of plural various angular positions relative to the keyboard. This known structure of a portable computer is not convenient for use with a pen base input device. Furthermore, the level position of the LCD assembly is not adjustable.

SUMMARY OF THE INVENTION

The present invention has been accomplished in consideration of the aforesaid circumstances. It is therefore an object of the present invention to provide a portable computer in which the LCD assembly can be conveniently adjusted to any of plural various level positions and any of plural various angular positions relative to the keyboard of the computer mainframe.

It is another object of the invention to provide a portable computer in which the LCD assembly is capable of receiving signals from both a keyboard of the mainframe and a pen base input device.

BRIEF DESCRIPTION OF THE DRAWINGS

FIG. 1 is an elevational side view of a portable computer according to the prior art and showing the LCD assembly in an open position;

FIG. 3 is a side elevational view of the invention showing the LCD assembly in plural various level and angular positions relative to the mainframe;

DETAILED DESCRIPTION OF THE PREFERRED EMBODIMENTS

Figure 2:
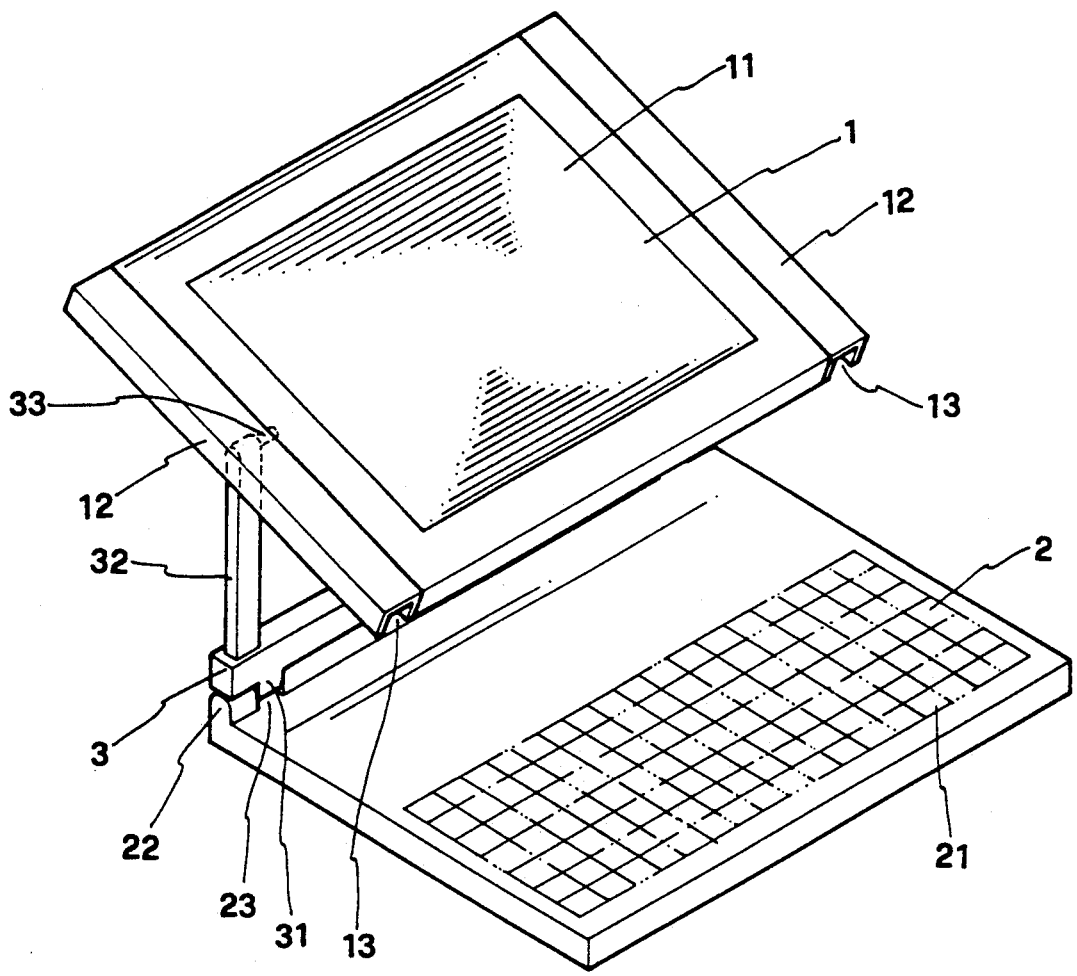
FIG. 2 is a perspective view of a portable computer according to the present invention and showing the LCD assembly in an open position for receiving signals from the keyboard of the mainframe.

Referring to FIG. 2, there is shown a portable computer in accordance with the present invention as generally comprising an LCD (Liquid Crystal Display) assembly 1, a mainframe 2, and a revolving shaft 3. The LCD assembly 1 includes an LCD screen 11 including opposed transverse edges surrounded by frame 12 that includes a pair of channels 13 which extend along substantially the entire length of the transverse edges. The LCD screen 11 receives keyboard signals, as well as signals from a pen base input device, and presents the signals thus received in visual form. The internal circuitry of the LCD screen 11 may be made by any conventional application or technique, and hence further description of such circuitry is not required.

The mainframe 2 includes a keyboard 21 on its top for inputting signals to LCD assembly 1. Mainframe 2 also includes an elongate block 21 extending upwardly from a top rear edge thereof and spaced from keyboard 21. The elongate block 22 is provide with two spaced notches 23 adjacent to opposite ends of block 22. The internal circuit of mainframe 2 is electrically interconnected to LCD assembly 1.

Figure 4:
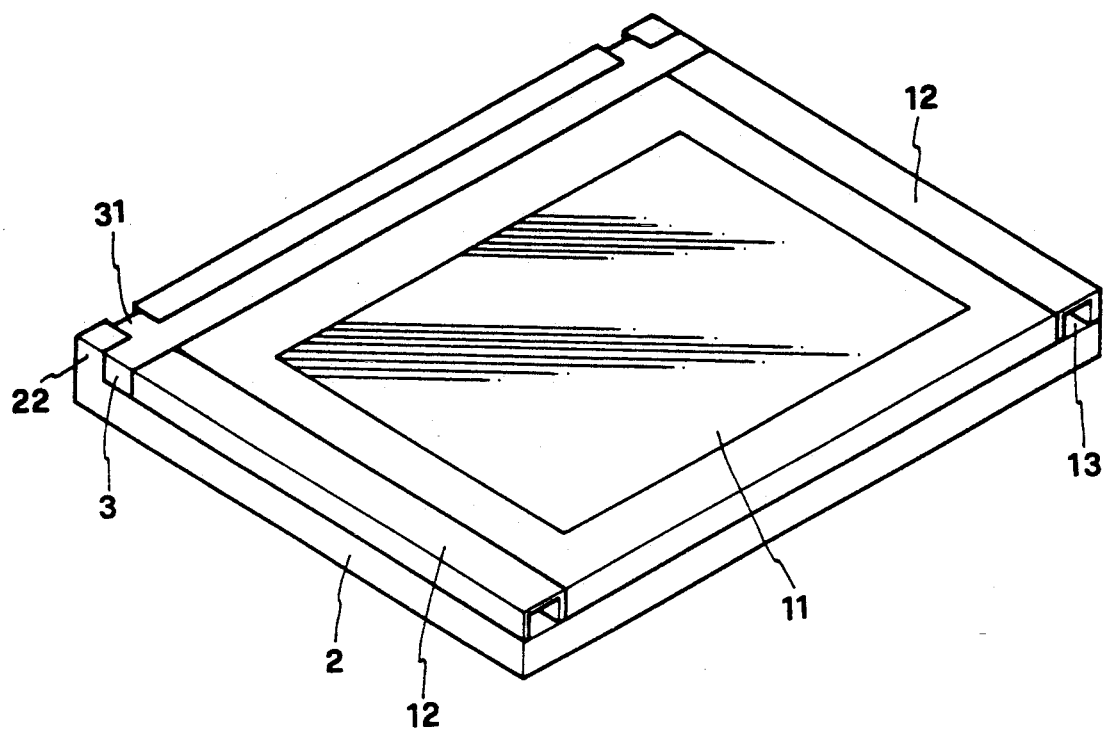
FIG. 4 is a perspective view of the invention showing the LCD assembly in a first folded position with the screen of the LCD assembly facing outwardly from the mainframe for receiving signals through a pen base input device.
Figure 5:
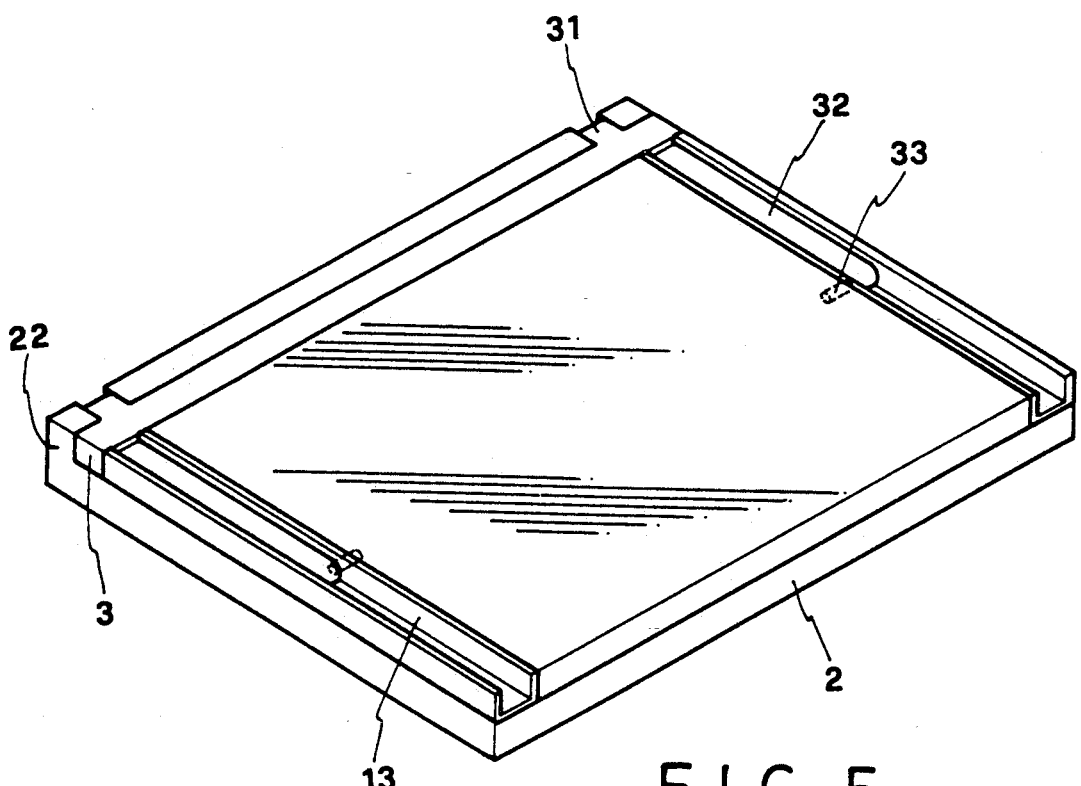
FIG. 5 is a perspective view of the invention with the LCD assembly in a second folded position wherein the screen of the LCD assembly faces inwardly towards the mainframe.

The revolving shaft 3 includes two perpendicular stub rods extending outwardly therefrom and pivotally secured within notches 23 of elongate block 22, and secured in place by elastic packing elements (not shown) so that the stub rods 31 may be rotated relative to the elongate block 22 about a first pivot access and retained in any of various angular positions relative to the mainframe 2. The revolving stub 3 further includes two perpendicular supports 32 extending outwardly from opposite ends thereof. Supports 32 are received within channels 13 of frame 12 when LCD assembly 1 is folded in either of two flat positions against mainframe 2, as shown in FIGS. 4 and 5. Each support 32 has an inwardly extending transverse pivot shaft 33 disposed adjacent a top free end thereof. Pivot shafts 33 are inserted through respective holes (not shown) formed in channels 13 of frame 12 and on either transverse edge of LCD screen 11. Thus pivot shafts 33 define a second pivot axis which is disposed parallel to and substantially midway between the opposed longitudinal edges of screen 11. Pivot shafts 33 are retained in place by elastic plastic elements (not shown). Therefore, the LCD assembly can be pivoted about the second pivot axis defined by transverse pivot shafts 33 of supports 32 and retained at any of various angular positions relative to the mainframe 2. The transverse pivot shafts 33 are of hollow construction and through which the internal circuitry of mainframe 2 may be electrically interconnected to the internal circuitry of the LCD assembly 1.

Referring to FIG. 3, the LCD assembly 1 is shown capable of being pivoted about the two aforementioned pivot axis to any of various angular and level positions relative to mainframe 2. Accordingly, assembly 1 can be disposed at a desired angular position relative to mainframe 2 by pivoting supports 32 about the first pivot axis defined by stub rods 31. Assembly 1 may also be disposed in any of various level positions relative to mainframe 2 by pivoting assembly 1 about the second pivot axis defined by transverse pivot shafts 33.

Referring to FIG. 4, the LCD assembly 1 is shown in a first folded position against mainframe 2. This is realized by pivoting supports 32 and assembly 1 about the two pivot axis so that screen 11 of assembly 1 is disposed in an outwardly facing position to permit the portable computer to be used as a pen base computer for signal input for a pen base input device.

Referring to FIG. 5, the LCD assembly 1 is shown in a second folded position wherein the portable computer is in a closed or non-operative mode. In this position, the screen 11 of assembly 1 is facing inwardly towards mainframe 2, with the back side of screen 11 facing outwardly. As further seen in this second folded position, and also apparent from the first folded position shown in FIG. 4, supports 32 are received within channels 13 of frame 12.

As indicated, the present invention provides a portable computer having an LCD assembly that is capable of receiving signals from both a keyboard and a pen base input device, wherein the assembly can be adjusted to dispose the screen at any of plural angular positions and any of plural level positions relative to the mainframe of the computer.

What is claimed is:

1. A portable computer of the type including a mainframe, a keyboard on the mainframe, a liquid crystal display assembly having a front screen and a back side, and means for electrically interconnecting the mainframe to the liquid crystal display assembly, the improvement comprising:
   a) the liquid crystal display assembly including a pair of opposed longitudinal edges, a pair of opposed transverse edges, and a channel extending along each transverse edge;
   b) a mainframe including a rear edge and an elongate block extending upwardly from the rear edge, the elongate block having a pair of spaced notches adjacent opposite ends thereof;
   c) a revolving shaft including a pair of perpendicular stub rods, the stub rods being secured within the spaced notches for pivotal movement about a first pivot axis;
   d) a pair of perpendicular supports extending outwardly from the revolving shaft adjacent opposite ends thereof, each support including an inwardly extending transverse pivot shaft, the transverse pivot shafts being secured to the transverse edges of the liquid crystal display assembly substantially midway between and defining a second pivot axis parallel to the opposed longitudinal edges of the display assembly;
   e) the first pivot axis permitting the display assembly to be positioned in any of plural various angular positions and the second pivot axis permitting the display assembly to be positioned in any of plural various level positions relative to the mainframe for receiving input signals from the keyboard; and
   f) the first and second pivot axis further permitting the display assembly to be folded against the mainframe in a first position with the front screen facing outwardly from the mainframe for receiving input signals from a pen base input device, and in a second position with the front screen facing inwardly towards the mainframe for closing the computer, and the supports being received within the channels when the display assembly is in both the first and second folded positions.

2. The portable computer of claim 1 further including:
   a) a first elastic packing means for securing the stub rods within the spaced notches for pivotal movement; and
   b) a second elastic packing means for securing the transverse pivot shafts to the transverse edges of the liquid crystal display assembly.

* * * * *